United States Patent [19]

Kosanovich

[11] 4,058,320
[45] Nov. 15, 1977

[54] GENERATOR SEAL OIL SUPPLY SYSTEM

[75] Inventor: Nicholas S. Kosanovich, Pittsburgh, Pa.

[73] Assignee: Westinghouse Electric Corporation, Pittsburgh, Pa.

[21] Appl. No.: 708,815

[22] Filed: July 26, 1976

[51] Int. Cl.² ............................................. F16J 15/40
[52] U.S. Cl. ........................................ 277/3; 277/15
[58] Field of Search ................. 277/15, 3, 2, 74, 81 R, 277/135; 138/30

[56] References Cited

U.S. PATENT DOCUMENTS

| | | | |
|---|---|---|---|
| 2,159,057 | 5/1939 | Sterrett | 277/15 |
| 2,307,755 | 1/1943 | Beckwith | 277/15 |
| 2,899,245 | 8/1959 | Michel | 277/15 |
| 2,903,280 | 9/1959 | Cuny | 277/15 |
| 3,770,179 | 11/1973 | McHugh | 277/2 |
| 3,792,721 | 2/1974 | Zahid | 138/30 |
| 3,917,289 | 11/1975 | Ivanov et al. | 277/74 |

Primary Examiner—Richard E. Aegerter
Assistant Examiner—L. Footland
Attorney, Agent, or Firm—J. W. Keen

[57] ABSTRACT

A system supplying oil to the seal plates of a generator. Seal oil is provided by a primary pump and a secondary pump which acts as a backup for the primary pump. Under normal operating conditions a portion of the seal oil supplied by either pump is diverted through a bypass line so that only a predetermined amount of oil actually flows to the seal plates. When the flow rate through the bypass line falls below a specific amount, the secondary pump is activated. If, at any time, the oil pressure supplied to the seal plates falls below a predetermined amount, then a hydraulic accumulator maintains the necessary pressure and flow rate for a relatively short period of time required to bring the backup pump to its proper pressure and flow rate.

8 Claims, 2 Drawing Figures

GENERATOR SEAL OIL SUPPLY SYSTEM

BACKGROUND OF THE INVENTION

1. Field of the Invention

This invention relates to means for preventing cooling gas leakage from the housing of a gas-cooled dynamoelectric machine and more particularly to a fluid supply system which maintains the required sealing fluid flow to a set of seal plates by detecting a variety of malfunctions and initiating corrective action.

2. Description of the Prior Art

In hydrogen-cooled turbine generators the rotor shaft ends must be brought out of a gas-tight enclosure, necessitating the use of some means to prevent escape of the gas along the shaft. Seal plates which are supplied with oil under pressure are used for this purpose. Oil is pumped to a feed groove between the annular seal plates. When the oil pressure in the feed groove exceeds the gas pressure in the turbine generator, some oil will be forced both ways along the shaft through the small clearance space between the seal plates and the shaft thus preventing escape of hydrogen gas from the turbine generator. The seal plates' function is to restrict the flow of oil through the sealing clearance space. These plates can move radially with the shaft, but are restrained from rotating.

The system supplying oil to the seal plates must maintain the oil pressure at some value above the hydrogen gas pressure in the turbine generator. It is also necessary to provide redundant means for supplying oil to the seal plates because loss of oil to them may cause extensive hydrogen leakage from the generator and damage to both the seal plates and shaft due to frictional heating caused by a lack of lubrication between them. An example of a sealing scheme used for hydrogen-cooled dynamoelectric machines is that of C. C. Sterrett, U.S. Pat. No. 2,159,057. Although a backup pump is provided by Sterrett in case of primary pump failure, there are no means to supply sealing oil to the seal plates during the time lag experienced in bringing the backup pump to its rated flow and pressure.

In present seal oil systems a constant pressure backup supply of seal oil is often provided by the turbine lubrication or hydraulic control systems. When the primary source of seal oil does not produce sufficient seal oil pressure, the backup source provides this pressurized oil. This occurs when a pressure regulator opens to permit oil to flow from the backup system to the seal plates when the pressure differential between the seal oil and hydrogen gas drops to a preset limit. In the existing seal oil systems, the normal operating differential pressure must be sufficiently high to allow early detection and correction of abnormal operation and yet prevent overlapping operation of the primary and backup sources of seal oil. These systems typically operate with a twelve psi pressure differential and require a minimum pressure differential of four psi for maintaining the gas seal. This range of pressure differentials allows sufficient separation between normal and abnormal operation to prevent premature actuation of the backup source of seal oil. Typical of this type of system is the British Pat. No. 1,167,192, which illustrates a standby lubrication system utilizing a hydraulic accumulator maintained at constant pressure for supplying oil in case of a primary lubricating pump failure and a pressure actuated backup pump. This system operates satisfactorily when the allowable range of pressure differentials is larger than two psi. When a smaller allowable range of pressure differentials occurs, utilizing pressure sensing devices for backup pump actuation can result in small system pressure surges causing simultaneous operation of the primary pump and backup pump.

More recently, with the application of hydrogen cooled generators to gas turbine drives, the seal oil system has been combined with the lubrication oil system of the turbine. The lubrication oil pump provides oil to the seal plates through a seal oil pressure regulator. Whatever backup provisions are used on the lubrication system also become the backup sources for the seal plates' oil supply. This type of system results in some simplification in that a separate source of seal oil pressure is not necessary but a relatively high pressure lubrication system is required. These systems typically operate with a pressure differential of 6 psi which is necessary to minimize hydrogen contamination by air entrained in the seal oil which flows along the shaft toward the hydrogen.

When the 6 psi pressure differential is required from entrainment considerations, when there is no independent source of sufficient pressure for seal oil backup, and when the turbine lubrication oil system does not operate at a sufficient pressure to maintain a 6 psi pressure differential at the seal plates, a new seal oil system design, different from past seal oil systems, is required. A major difficulty in the design of a seal oil system with a 6 psi pressure differential is that the allowable pressure range of 6 to 4 psi is nearly impossible to maintain by using pressure sensors only without experiencing either overlapping operation of the primary and backup oil supply systems or seal oil flow interruption to the seal plates resulting in hydrogen leakage and shaft damage.

SUMMARY OF THE INVENTION

In accordance with the present invention, a seal oil system is provided for supplying seal oil to the seal plates of a gas-tight turbine generator both for normal operation and backup operation. A differential pressure between the seal oil and hydrogen gas must be maintained in order to avoid hydrogen leakage. Two modes of backup operation are required for: (1) a sudden failure of the primary seal oil supply and (2) a relatively slow degradation of the seal oil supply.

This system has a primary seal oil pump which supplies oil to the seal plates and takes its suction either from the lubrication pump or from the oil reservoir. A fraction of the primary pumps oil discharged into the seal plates feedline is diverted through a bypass line back to the reservoir. The fraction of oil diverted is regulated so as to maintain the normal seal oil pressure differential at the seal plates. The bypass line has a flow measuring device that actuates a backup pump when the bypass flow falls below a preset limit. The backup pump takes suction from either the lubrication pump or from the oil reservoir and discharges into the seal plates feedline. By use of the flow measuring device rather than differential pressure sensors, the system can detect many types of malfunctions and anticipate the need for intitiating backup pump operation before seal oil differential pressure actually begins to drop.

The flow measuring device is an excellent malfunction detector when the seal oil supply degrades relatively slowly, but when the failure is abrupt the backup pump cannot be brought up to full pressure before the seal oil flow is interrupted causing gas leakage and seal plate damage. Thus a hydraulic accumulator is utilized to force seal oil into the seal plates feedline for several seconds when the seal oil pressure drops below the normal operating level. In order to prevent oil which has been forced from the accumulator from flowing back to the primary and backup pumps, a check valve is placed in the seal plates feedline between the pumps point of discharge and the hydraulic accumulators point of fluid communication.

Thus, when a relatively low pressure differential, such as 6 psi, is desired on a seal oil system for a turbine generator and the turbine lubrication system does not operate at a sufficient pressure to maintain that pressure differential, a separate seal oil pump is required. Also, when there is no independent source of sufficient pressure for seal oil backup, another separate pump must be utilized as a backup. To insure non-interrupted seal oil flow during a malfunction and still prevent overlapping pump operation, an arrangement having a bypass line with a flow measuring device is utilized along with the hydraulic accumulator.

BRIEF DESCRIPTION OF THE DRAWING

For a better understanding of the invention, reference may be had to the preferred embodiment, exemplary of the invention, shown in the accompanying drawings, in which.

DESCRIPTION OF THE PREFERRED EMBODIMENT

Figure 1:
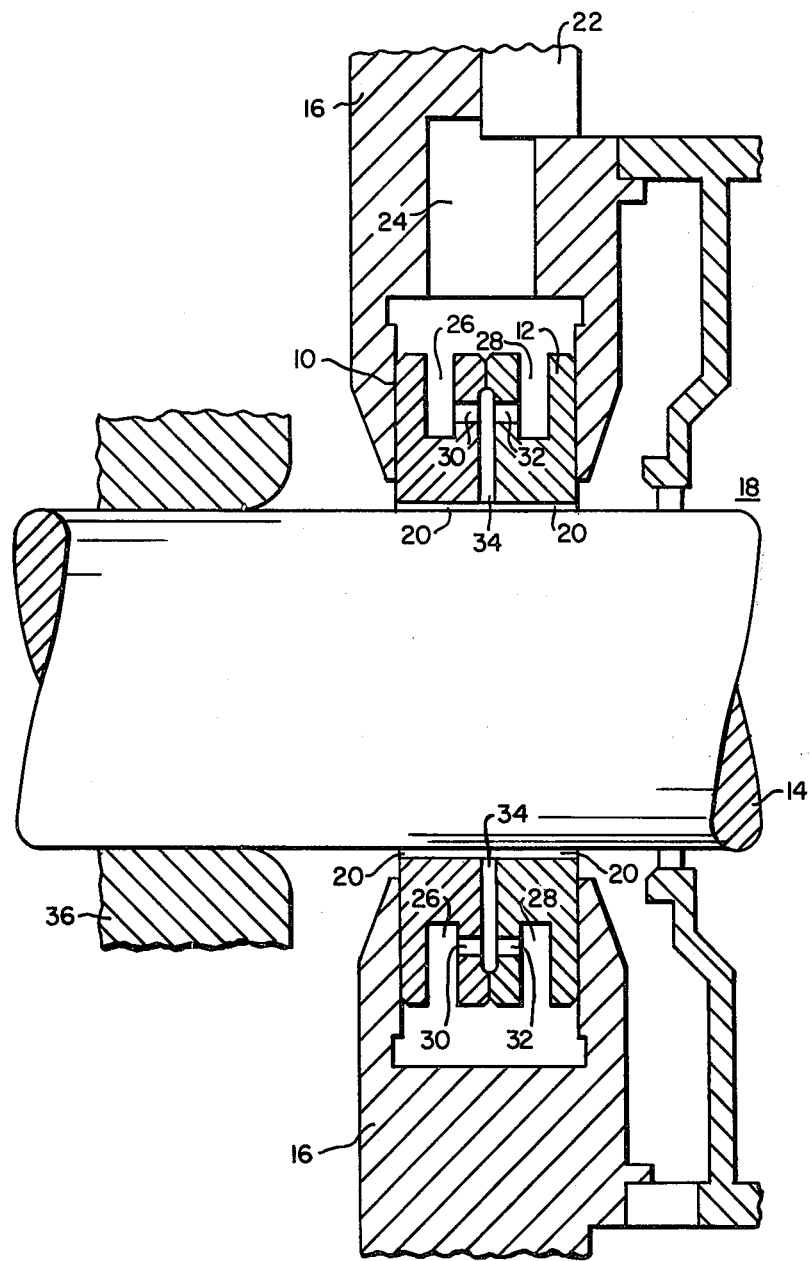
FIG. 1 is a partial sectioned view of the seal plates surrounding a shaft.

In FIG. 1 seal plates 10 and 12 are shown disposed in operating position around a rotating shaft 14. The seal plates 10 and 12 are prevented from rotating by dowels (not shown) attached to a generator housing 16. Hydrogen 18 is retained in the generator housing 16 by a gland seal 20 which is formed by seal fluid running along the shaft 14 in both directions thus filling the clearance which is typically 0.002 of an inch between the seal plates and shaft. The seal fluid flow is pumped to a cavity 22 and from cavity 22 to opening 24 into seal plate grooves 26 and 28. From the seal plate grooves 26 and 28 seal fluid flows through ports 30 and 32 into a cavity 34 between the seal plates 10 and 12. From the cavity 34 the seal fluid flows into the clearance between the seal plates 10 and 12 and the shaft 14 with a portion of the seal fluid flowing toward the hydrogen 18 and a portion of the seal fluid flowing toward bearing 36.

Figure 2:
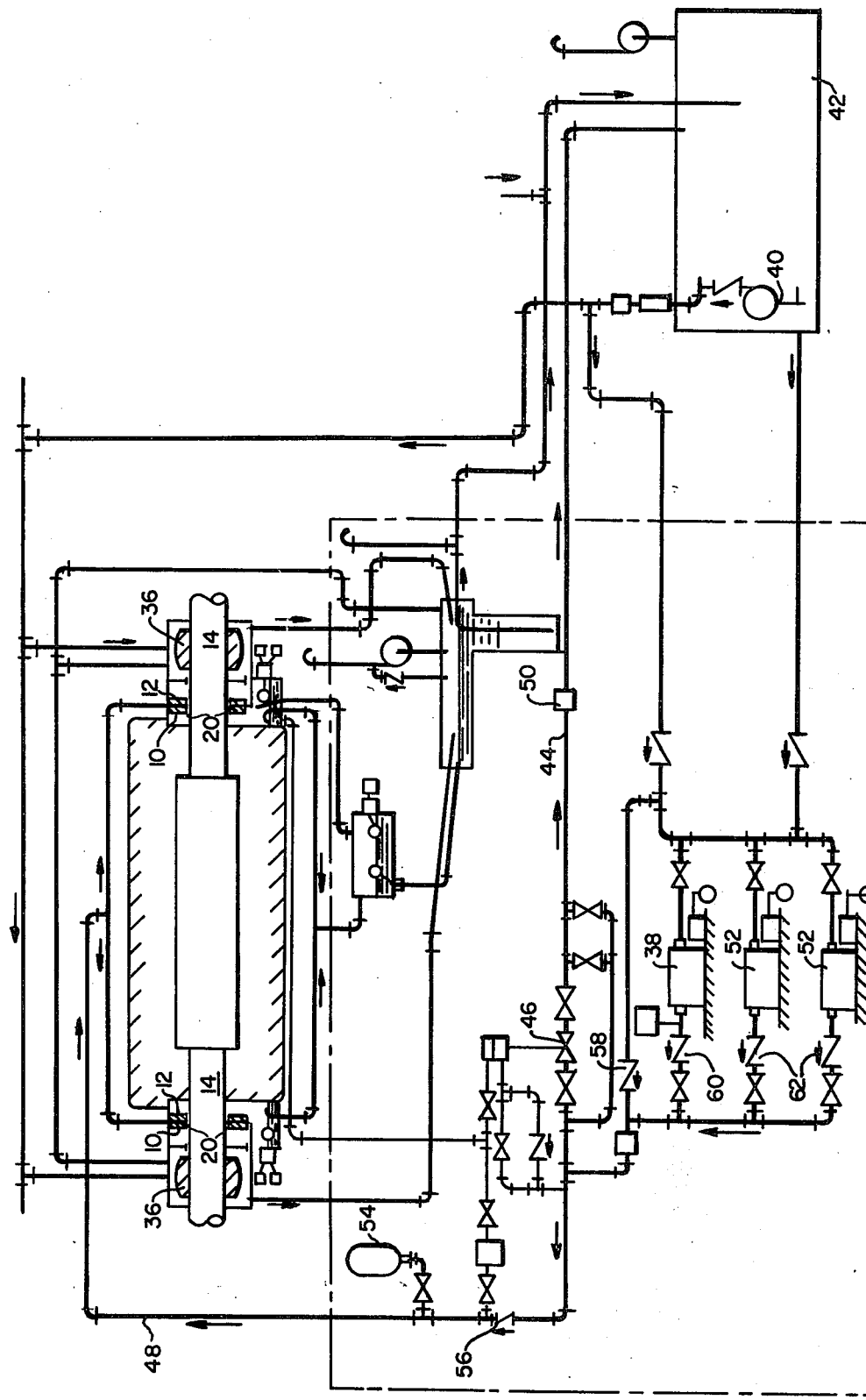
FIG. 2 is a schematic diagram for the seal oil system of a generator in which the invention is incorporated.

FIG. 2 shows the schematic drawing of an entire seal fluid supply system utilizing this invention. A primary seal fluid pump 38 supplies fluid to the seal plates 10 and 12 either from the discharge of a turbine lubrication fluid pump 40 or from a seal fluid reservoir 42. A portion of the seal fluid discharged by the pump 38 is diverted through a bypass line 44. The portion of fluid bypassed is varied by a differential pressure regulator 46 which maintains normal seal fluid pressure in seal plate feedline 48. A flowmeter 50 measures the flow in the bypass line 44 and actuates a backup pump 52 when the flow rate falls below a predetermined level. The backup pump 52 takes suction either from lubrication pump 40 or fluid reservoir 42 and discharges into the seal plate feedline 48. If the pressure in line 48 drops below the normal operating pressure, a hydraulic accumulator 54 will supply seal fluid to the seal plate feedline 48. A check valve 56 will prevent backflow in line 48. The check valve 58 will prevent flow from line 48 to the discharge side of the lubrication fluid pump 40. Check valves 60 and 62, located in the discharge sides of pumps 38 and 52, prevent backflow through each of the pumps when the opposite pump is operating.

Other switches, valves, and alarms shown in FIG. 2 are of a character generally common to known seal oil systems or demonstrate well known oil supply system techniques. Various other specific arrangements may also be employed in the practice of the present invention.

What is claimed is:

1. A system with a seal fluid supply, said system comprising:
   a. a housing containing a gas;
   b. a rotatable shaft passing through said housing, said shaft and housing being separated by a predetermined gap;
   c. means for sealing said predetermined gas against gas leakage therethrough;
   d. a fluid reservoir;
   e. a primary pump with its suction side in fluid communication with said fluid reservoir;
   f. first conduit means of fluid communication between the discharge side of said primary pump and said sealing means;
   g. second conduit means of fluid communication between said sealing means and said fluid reservoir;
   h. bypass means for providing fluid communication between said first conduit means and said fluid reservoir;
   i. a secondary pump with its suction side in fluid communication with said fluid reservoir and its discharge side in fluid communication with said first conduit means;
   j. means for maintaining a predetermined pressure differential between the fluid in said first conduit means and said gas;
   k. means for sensing flow rate in said bypass means and for signaling said secondary pump to operate when said flow rate falls below a predetermined level; and
   l. first valving means causing said seal fluid to flow only from the suction side to the discharge side of said primary pump and a second valving means causing said seal fluid to flow only from the suction side to the discharge side of said secondary pump.

2. The system of claim 1, further comprising: a hydraulic accumulator in fluid communication with said first conduit means, said hydraulic accumulator having the capability of storing a volume of said fluid at normal system operating pressure and forcing said fluid into said first conduit means when the pressure in said first conduit means falls below normal operating level.

3. The system of claim 2, further comprising: a third valving means disposed in said first conduit means before the point that said hydraulic accumulator has fluid communication with said first conduit means and after the point of fluid communication with both said primary and said secondary pumps, said third valving means causing the fluid discharged from said hydraulic accumulator to flow through said first conduit means toward said sealing means.

4. The system of claim 1, wherein said means for maintaining a predetermined pressure differential comprises: a differential pressure regulator which controls said pressure differential by variably restricting the flow through said bypass means.

5. A system with a seal fluid supply, said system comprising:
   a. a housing containing a gas;
   b. a rotatable shaft passing through said housing, said shaft and housing being separated by a predetermined gap;
   c. means for sealing said predetermined gap against gas leakage therethrough;
   d. a fluid reservoir;
   e. a lubricating fluid pump with its suction side in fluid communication with said fluid reservoir;
   f. a primary pump with its suction side in fluid communication with the discharge side of said lubricating fluid pump;
   g. a secondary pump with its suction side in fluid communication with the discharge side of said lubricating fluid pump;
   h. first conduit means of fluid communication between the discharge side of said primary pump and said sealing means and between the discharge side of said secondary pump and said sealing means;
   i. second conduit means of fluid communication between the discharge side of said lubricating fluid pump and said first conduit means;
   j. third conduit means of fluid communication between said sealing means and said fluid reservoir;
   k. bypass means for fluid communication between said first conduit means and said fluid reservoir;
   l. means for maintaining a predetermined pressure differential between the fluid in said first conduit means and said gas;
   m. means for sensing flow rate in said bypass means and for signaling said secondary pump to operate when said flow rate falls below a predetermined level;
   n. first valving means preventing flow from said first conduit means to the discharge side of said lubricating fluid pump; and
   o. second valving means causing said seal fluid to flow only from the suction side to the discharge side of the said primary pump and a third valving means causing said seal fluid to flow only from the suction side to the discharge side of said secondary pump.

6. The system of claim 5, further comprising: a hydraulic accumulator in fluid communication with said first conduit means, said hydraulic accumulator storing a volume of said fluid at normal system operating pressure and forcing said fluid into said first conduit means when the pressure in said first conduit means falls below normal operating level.

7. The system of claim 6 further comprising: a fourth valving means disposed in said first conduit means before the point that said hydraulic accumulator has fluid communication with said first conduit means and after the point of fluid communication of said first conduit means with said primary pump, said secondary pump, and said second conduit means, with said fourth valving means causing the fluid discharged from said hydraulic accumulator to flow through said first conduit means toward said sealing means.

8. The system of claim 5, wherein said means for maintaining a predetermined pressure differential comprises: a differential pressure regulator which controls said pressure differential by variably restricting the flow through said bypass means.

* * * * *